Oct. 14, 1952 R. R. FREAS, JR 2,614,159
TIMING OR DRIFT CIRCUITS FOR LORAN NAVIGATION SYSTEMS
Filed March 11, 1949 6 Sheets-Sheet 6.

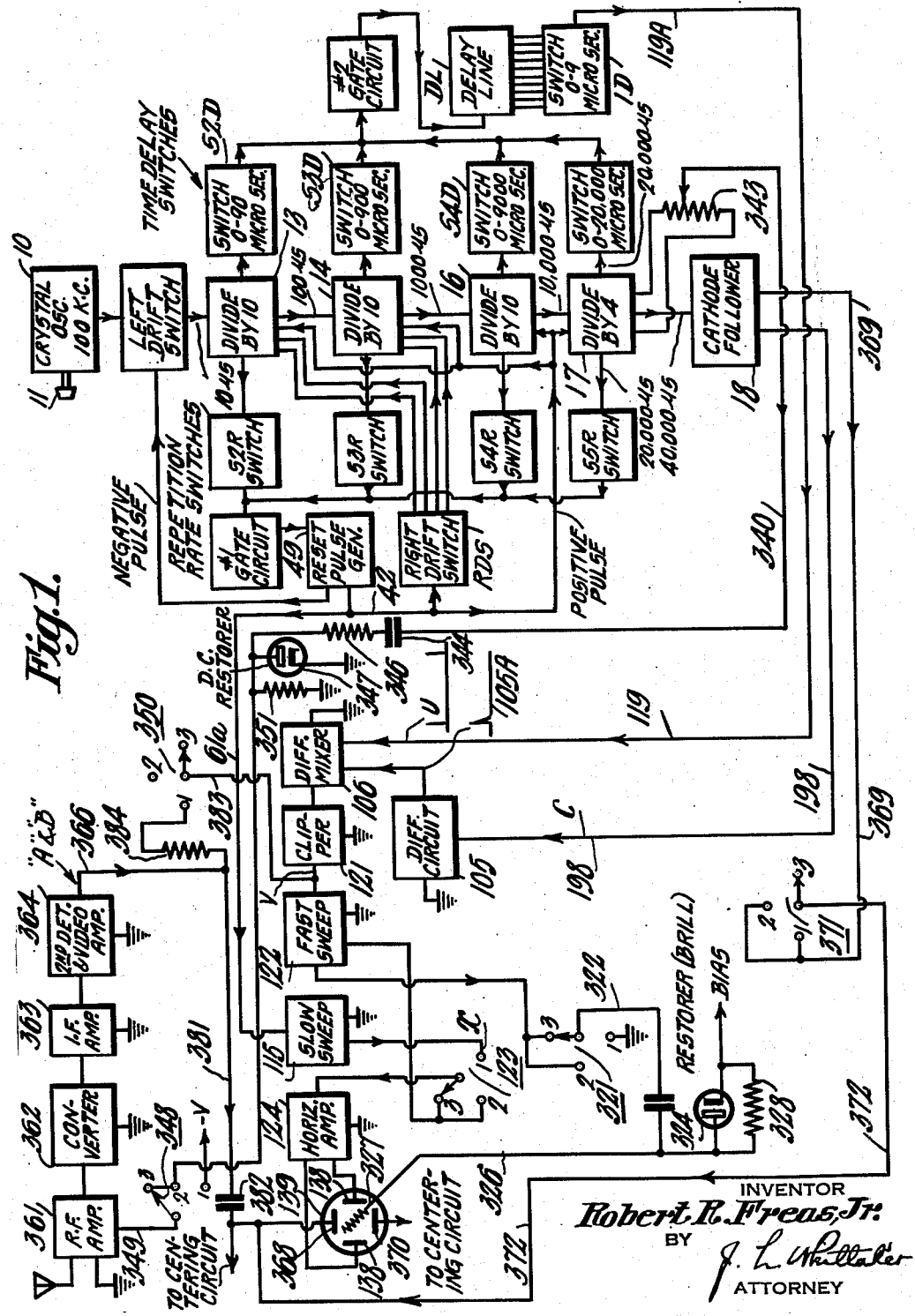

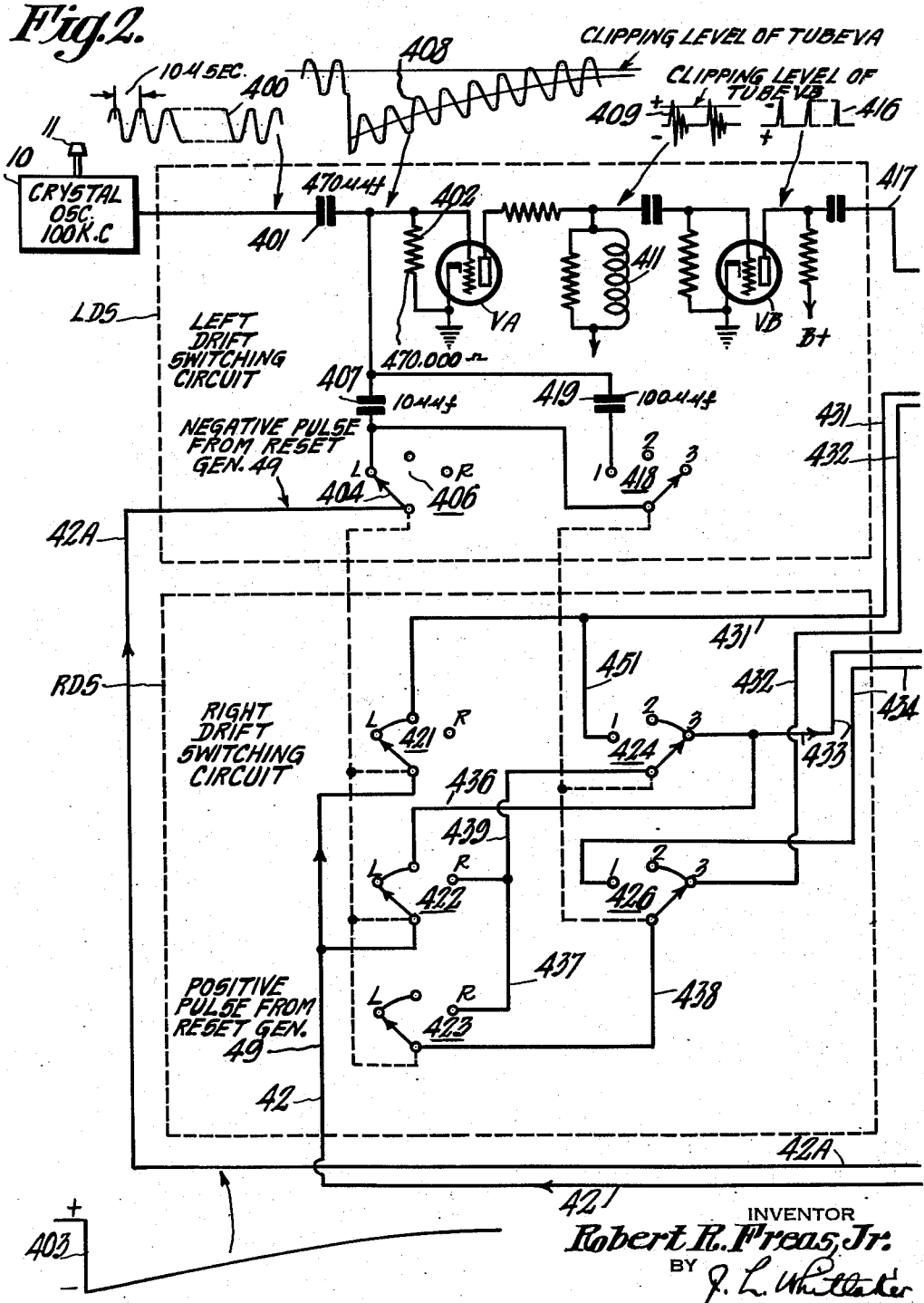

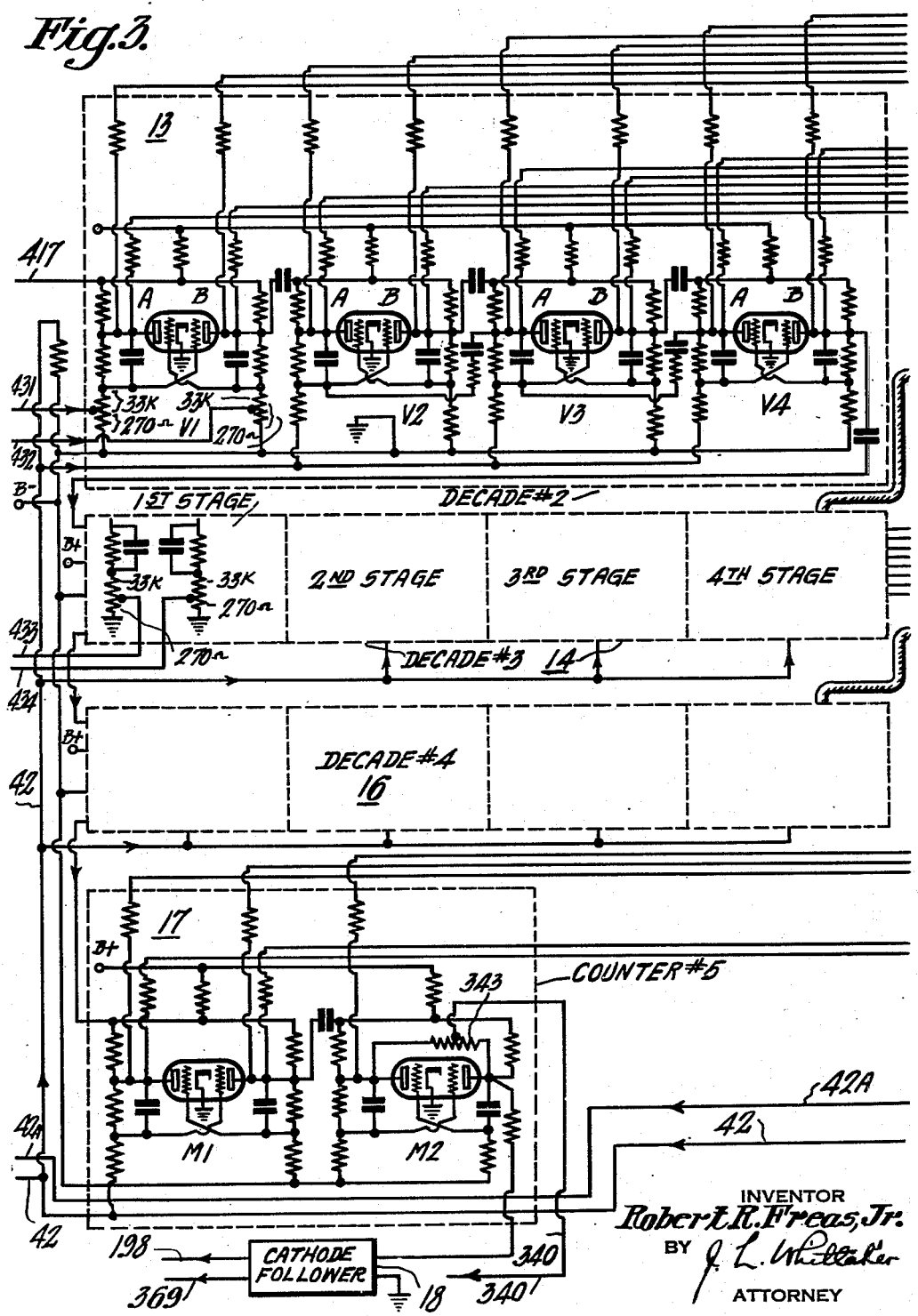

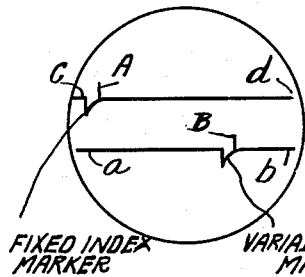
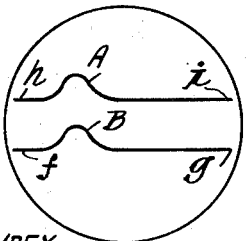
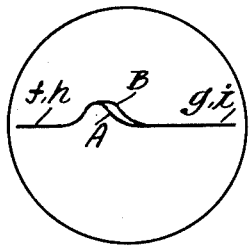
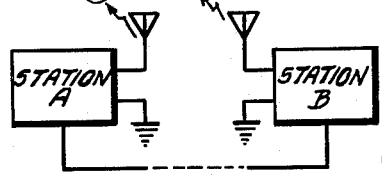
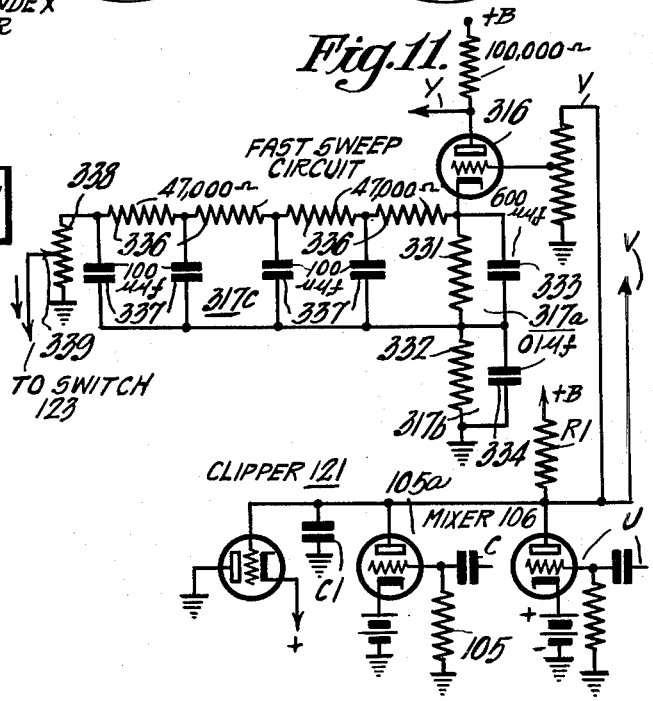
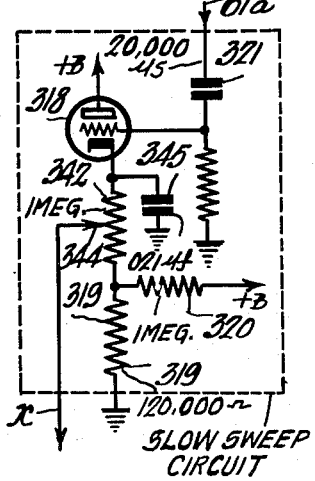
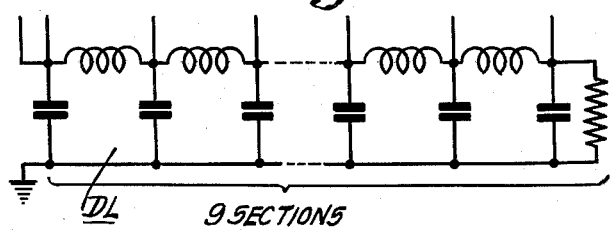

AT GIVEN COUNT, SELECT PLATES INDICATED BY DOTS FOR COINCIDENCE INDICATION

INVENTOR
*Robert R. Freas, Jr.*
BY
*J. L. Whittaker*
ATTORNEY

Patented Oct. 14, 1952

2,614,159

UNITED STATES PATENT OFFICE 2,614,159

TIMING OR DRIFT CIRCUITS FOR LORAN NAVIGATION SYSTEMS

Robert R. Freas, Jr., Jermyn, Pa., assignor to Radio Corporation of America, a corporation of Delaware Application March 11, 1949, Serial No. 80,784

13 Claims. (Cl. 175—381)

My invention relates to radio navigation systems of the "loran" type utilizing the time difference in the propagation of radio pulses from synchronized ground stations, and to improved left drift and right drift circuits for counter systems designed to produce pulses which have selected repetition rates and which are delayed selected amounts.

The present invention is an improvement on the system of the type described and claimed in application Serial No. 33,846, now Patent No. 2,523,244, issued September 19, 1950, filed June 18, 1948 in the name of John D. Woodward. Loran systems require some means for producing what is referred to as a "left drift" and/or a "right drift" of a received ground station pulse as it appears on the timing sweep of the cathode ray indicator tube in the receiver. This will be understood from the description hereinafter. In the said Woodward application, it was assumed that left or right drifts would be obtained by changing the crystal oscillator frequency slightly. In practice, this is not very satisfactory largely because the resulting drift is slower than desired. In prior art loran systems it has been the practice to provide special drift circuits suitable only to the prior art blocking oscillator type of timer. These prior art circuits, in general, cannot be applied to the Woodward type of circuit because of the difference in timers.

According to the present invention, improved drift circuits are provided that are particularly, but not exclusively, applicable to a system of the Woodward type. Both fast and slow left drift are provided and both fast and slow right drift are provided.

The present invention will be described specifically, by way of example, with reference to the system described and claimed in application Serial No. 78,482, now Patent 2,551,681, issued May 8, 1951, filed February 26, 1949, in the names of Howard C. Lawrence, Jr. and Robert R. Freas, Jr. The said Lawrence and Freas system is an improvement on the said Woodward system, the Woodward system requiring a higher frequency oscillator and counter decade than required by the Lawrence and Freas system.

Navigation systems of the "loran" type employ pairs of synchronized ground transmitting stations that emit radio pulses having a fixed time relation. Each paid of ground stations preferably transmits pulses at an assigned individual repetition rate for the purpose of station selection. The pulses are broadcast so that they may be received by means of equipment located in the aircrafts or ships whose positions are to be determined. By means of the receiving equipment, the operator on the craft determines the time difference between the pulses from the two transmitter stations of one pair as they arrive at the receiver. Since the radio pulses travel from the ground transmitters to the receiver at a known propagation rate (i. e., at the velocity of light), it is known that the position of the craft is at some point on a line corresponding to the time difference reading. By obtaining the time difference reading from a second pair of ground stations, a second line corresponding to the second time difference reading is obtained, and the intersect point of the two lines is the position of the craft. Special maps having the "time difference" or "loran" lines printed thereon for the several pairs of ground stations are provided for use with the navigation system.

In order to measure the time difference in the arrival of successive pulses from a pair of ground stations, the receiving equipment is arranged to generate pulses at selected repetition rates. The pulses may be adjusted to have a definite time relation to time of arrival of the ground station pulses and are provided for the purpose of driving or synchronizing cathode-ray deflecting circuits. The deflecting circuits produce cathode-ray sweep traces on which the received ground station pulses are displayed. These selected-repetition-rate and adjustably-delayed pulses are obtained from a system comprising counters and switching to be described in detail hereinafter.

For the purpose of selecting a particular pair of ground stations, the operator selects the particular pulse repetition rate for the driving or synchronizing pulses corresponding to the repetition period of the pulses transmitted from said pair whereby the deflecting circuits may be synchronized with the received pulses from the selected pair of ground stations. This repetition rate selection is accomplished by adjusting the repetition-rate-determining switches of a chain of counters as described in said Woodward application and as described hereinafter. Thus a particular pair of ground stations is selected at the receiver apparatus by setting the said counter switches to preselected positions. This preferably is done by turning a single station selection knob operating the several counter switches. Assuming the station selection switches are ganged, the station selection knob is turned to a position indicated on the receiver panel for obtaining sweep synchronizing pulses having the same repetition period as that of the pulses being transmitted from the selected pair of ground stations. Now the received pulses from the selected pair of ground stations can be made to appear stationary on the cathode-ray sweep or trace whereas those received from the other pairs of ground stations will move along the same trace.

The pulses from the two transmitter stations of a selected pair will be referred to as A and B pulses, respectively, and the B pulse is identified in the present system as the pulse that occurs after or follows the mid-point of the other pulse period. In operation, the A and B pulses are displayed, respectively, first on two slow-sweep cathode-ray traces and then on two fast-sweep cathode-ray traces, thereby enabling the operator to obtain an alignment of the A and B pulses by adjusting another set of switches, referred to as delay-determining switches, so that the time difference between the pulses driving or synchronizing the cathode-ray deflecting circuits equals exactly the time difference between A and B pulses.

As described in the above-mentioned Lawrence and Freas application, certain of said delay-determining switches are switches connected to said chain of counters just as described in said Woodward application, for example, but at least one of the delay-determining switches is connected to a tapped delay line or the like instead.

It will be noted that the chain of counters has two sets of switches connected to it, one for determining the repetition rate and the other for determining in part the amount a pulse is delayed. The action of each is independent of the action of the other.

The reason for employing a delay line with delay-determining switching connected thereto is that it simplifies the equipment and, what is more important, its use makes it possible to begin the counter chain with a lower frequency decade counter unit and thus avoid serious difficulties encountered in operating such a unit at a very high frequency.

The adjustment for the display and alignment of the A and B pulses is accomplished by first setting the A pulse at the left end of the upper slow-sweep trace (by means of drift switching circuits described hereinafter), when the receiving apparatus is switched to an operating position marked No. 1. The B pulse will then appear on the lower cathode-ray trace and a variable index marker may now be located under the B pulse, this being done by adjusting the several delay switches to delay the variable index marker the correct amount. The apparatus is then switched to a No. 2 fast-sweep operation position so that the A and B pulses appear on two fast-sweep traces, respectively. The starting time of the fast-sweep trace on which the B pulse appears always coincides with the start of said variable index marker as determined by the delay switches, while the starting time of the fast-sweep trace on which the A pulse appears, coincides with the start of the slow-sweep trace. Therefore, by a more exact adjustment of the delay switches, the adjustable fast-sweep wave is caused to start at the proper time to bring the A and B pulses into alignment. In order to insure exact alignment, the A and B pulses should be made to have the same amplitude, and an amplitude balance control circuit is provided for this purpose. After these adjustments have been made, the time difference between the starts of the fast sweeps will exactly equal the time difference between the A and B pulses from the transmitters, and this time difference can be read directly from the settings of the delay switches.

In the specific example herein described as applied to a navigation system, the counter chain comprises three decade counters that divide by 10 followed by a frequency divider that divides by 4. The first stage of the "divide by 4" unit is a binary counter (a multivibrator) that is the last stage, strictly speaking, of the counter chain. The second multivibrator of the "divide by 4" unit has no reset pulse applied to it. The decade counters are preferably of the general type described in application Serial No. 580,446, now Patent 2,521,788, issued September 12, 1950, filed March 1, 1945, in the name of Igor E. Grosdoff. More specifically, the counter and counter switching combination utilizes principles described in application Serial No. 719,035, filed December 28, 1946, in the name of Charles J. Young, now Patent No. 2,490,500 issued December 6, 1949, but, as set forth in said Woodward application, includes improvements over and additions to the combination disclosed by Young.

The delay pulses having a delay that is determined by the settings of the delay-determining switches are applied to a delay line and are taken off taps on the delay line through a delay-determining switch for obtaining delays in steps of one microsecond.

An object of the present invention is to provide an improved method of and means for determining the time difference between electrical pulses.

A further object of the invention is to provide improved receiving equipment for a radio navigation system of the type utilizing the propagation of radio pulses from pairs of synchronized ground stations.

A still further object of the invention is to provide an improved method of and means for indicating the time difference between radio pulses transmitted from synchronized ground stations.

A still further object of the invention is to provide an improved method of and means for obtaining a direct reading of the time difference between radio pulses transmitted from synchronized ground stations.

A still further object of the invention is to provide an improved method of and means for obtaining left drift and/or right drift of the received pulses appearing on an indicator tube of receiving equipment for a radio navigation system of the type utilizing the propagation of radio pulses from pairs of synchronized ground stations.

The invention will be better understood from the following description taken in connection with the accompanying drawings in which:

Figure 1 is a block and circuit diagram of navigation receiving apparatus designed in accordance with one embodiment of the invention, Figure 2 is a circuit diagram of the left drift and right drift switching circuits, Figures 3 and 3A, to be placed side by side, are block and circuit diagrams of the counter and the associated repetition rate switching and delay switching shown in block in Figure 1.

Figure 4 is a block diagram representing one pair of ground radio transmitter stations of the navigation system which transmit A and B pulses, respectively, Figure 5 is a group of graphs which are referred to in explaining the operation of the navigation system shown in Figure 1, Figure 6 is a group of graphs which are referred to in explaining the operation of the counter system shown in Figures 1, 2 and 3.

Figure 7 is a view of the slow-sweep cathode-ray traces appearing on the screen end of the cathode-ray indicator tube that is included in the apparatus of Figure 1 and of the received pulses A and B as they appear on the traces when they are "aligned,"

Figure 8 is a view of the fast-sweep cathode-ray traces on the cathode-ray tube indicator and of the received pulses A and B as they appear on the two fast-sweep traces, respectively, during the next step in obtaining more exact alignment of the A and B pulses, Figure 9 is a view showing the fast-sweep traces of Figure 8 superimposed or collapsed for the final alignment step and showing the A and B pulses exactly aligned and superimposed, Figures 10 and 11 are circuit diagrams of the horizontal deflecting slow-sweep and fast-sweep circuits, respectively, employed in the system of Figure 1, and Figure 12 is a circuit diagram of the delay line shown in block in Figure 3A.

In the several figures, similar parts are indicated by similar reference characters.

THE COUNTER CHAIN AND ASSOCIATED REPETITION RATE SWITCHES AND DELAY SWITCHES

Referring to the navigation receiving apparatus shown in Figures 1, 2, 3 and 3A, the pulse-producing system comprises a crystal oscillator 10 that produces a sine wave voltage of stable frequency which in the example illustrated is 100 kilocycles per second, the repetition period being 10 microseconds. The frequency of the crystal oscillator output may be increased or decreased slightly by a manual adjustment as indicated at the control knob 11 for obtaining a right or left drift of a received pulse on a cathode-ray sweep trace but it is preferred to obtain right or left drift by means of drift switching circuits (see Figures 2 and 3) which embody the present invention. This prevents the possibility of interrupting the continuity of the oscillator output, a disadvantage to which the prior art circuits are known to be susceptible. Such interruption changes the location of the received pulse on the indicator, which is very annoying operationally.

The crystal oscillator 10 supplies signal through a left drift switch circuit LDS (shown in detail in Figure 2) to drive a decade counter 13 for producing periodic pulses which recur at the rate of 10 kilocycles per second. The repetition period or time interval between successive pulses is, therefore, 100 microseconds.

The frequency of the 100 $\mu$s. pulses is divided by 10 by means of a second decade counter 14 to produce 1000 $\mu$s. pulses. The frequency of the 1000 $\mu$s. pulses is divided by 10 by means of a third decade counter 16 to produce 10,000 $\mu$s. pulses, and the frequency of these is divided by 4 by means of a frequency divider or a counter 17 to produce 40,000 $\mu$s. pulses. As explained hereinafter, the decades and the first stage of the divider 17 comprise a counter chain. The output of divider 17 is in the form of a square wave having the repetition period of 40,000 $\mu$s. This square wave is always symmetrical regardless of the repetition rate since the reset pulses are not applied to the second and last stages of the divider 17 as will be understood from the later detailed description. The square output wave is passed through a cathode follower tube 18 and from it are obtained a vertical separation wave and, by means of a shaping circuit, a pulse for driving or synchronizing the fixed horizontal fast-sweep deflection as explained hereinafter.

A variable index marker pulse, which is obtained by way of a gate circuit No. 2, a delay line DL, and a switch 1D, is adjustable in timing or delay whereby it may be shifted along the sweep trace when a slow sweep is used and whereby it may be utilized to trigger the adjustable fast-sweep when the fast-sweep is used.

The amount the variable index marker pulse is delayed is determined by the setting of time delay switches 1D, S2D, S3D, S4D, and S5D. With the exception of switch 1D, these switches, as shown in Figure 3A, are multipole multicontact switches that are connected to the several anodes of the multivibrator tubes in the counters. The switch 1D is connected to taps on the delay line DL for obtaining a delay in one microsecond units as explained hereinafter.

The repetition rate of the pulse from gate No. 2, as well as that of the other pulses taken off the counter chain, including the pulse taken off a gate circuit No. 1, may be varied for the purpose of station selection by means of repetition rate switches S2R, S3R, S4R, and S5R which are similar to the delay switches S2D, etc. and which are connected to the anodes of the counter tubes in a similar fashion. Pulses taken off the switches S2R, etc. are passed through the gate circuit No. 1 and are supplied to a reset pulse generator 49 which may comprise a Thyratron as explained hereinafter.

The output pulses of the pulse generator 49 have the same repetition rate as the output pulses from gate circuit No. 1 but have a greater energy content. Positive and negative polarity pulses are taken off the pulse generator 49 by way of leads 42 and 42A, respectively. The positive pulses are utilized both to drive the slow sweep circuit, as described hereinafter, and to reset the counters.

As will be explained in detail hereinafter the positive reset pulses for the first counter stages of decades 13 and 14 are applied to said stages by way of a right drift switching circuit RDS shown in detail in Figure 2.

The negative pulse from the pulse generator 49 is applied to the left drift switching circuit LDS. The left and right drift circuit operations will be described hereinafter with reference to Figure 2.

A detailed description of Figures 2, 3, and 3A will be given later, but first the other parts of the navigation system will be explained. In the example being described, it will be assumed that the first pair of ground stations transmit the A pulses with a repetition period of 40,000 $\mu$s. and transmit the B pulses with a like repetition period; that the second pair of ground stations transmit A and B pulses having a repetition period of 39,900 $\mu$s.; that the third pair transmits 39,800 $\mu$s. pulses; that the fourth pair transmits 39,700 $\mu$s. pulses, etc. It is apparent that for station selection at the receiving apparatus, the operator must be able to select corresponding repetition periods for the output pulses of the counter system which control the cathode-ray deflection cycle; namely, periods of 40,000 $\mu$s.; 39,900 $\mu$s.; 39,800 $\mu$s.; 39,700 $\mu$s.; 39,600 $\mu$s.; etc.

However, it may be preferred to employ a different group of repetition periods than the group of 40,000 $\mu$s., 39,900 $\mu$s., etc. assumed above. For example, repetition periods of 30,000 μs., 29,900 μs., etc. may be employed. Or, as another example, repetition periods of 50,000 μs., 49,900 μs., etc. may be employed.

CATHODE RAY TRACE PRESENTATION

At this point, it may be well to give a description of the operation of the receiving apparatus shown in Figure 1 with particular reference to the cathode-ray deflecting waves and the cathode-ray tube presentation.

In Figure 5, the graphs X and W show the wave shapes of the slow-sweep and fast-sweep horizontal deflecting waves, respectively, for obtaining the desired cathode-ray traces. The wave V comprises a pair of recurring pulses, the second of which (referred to as the variable index marker) is adjustable in time and determines the starting time $t$ of the wave $f-g$ of the graph W. The starting time $t$ of the variable index marker in relation to the fixed index marker may be adjusted by adjusting the switches 1D, S2D, etc. (Figures 1 and 3A), as will be explained hereinafter, for aligning the A and B pulses. By means of ganged function switches, three switching positions identified as positions No. 1, No. 2, and No. 3 are used successively in aligning the A and B pulses. It will be understood that while the pulses A and B and their corresponding fast-sweep traces appear alternately on the cathode-ray tube screen, they appear to the eye to occur simultaneously because of persistence of vision, lag of phosphorescence of the screen or both.

As shown in Figure 5, the B pulse is the one that occurs after the mid-point of the A pulse period, and consequently the time interval, which elapses between the occurrence of a B pulse and the succeeding A pulse will be less than one-half pulse interval. As will be seen in Figure 5, the start of one fast-sweep ($h-i$) coincides with the start of a slow trace, while the start of the other fast-sweep ($f-g$) coincides with the variable index marker.

By employing the left-right drift switches, a momentary change in the recurrence rate may be produced to change the location of the pulses on the trace by "drifting" them along the trace. Specifically, it is possible for the operator to locate the A pulse at the left side of the upper slow trace, which in turn will cause the B pulse to fall on the lower trace, and the variable index marker may be made to coincide with the B pulse. Therefore, when the function switches are turned to position No. 2, the A pulse will occur during the trace described by the fixed fast-sweep deflecting wave $h-i$, while the B pulse will occur during the trace described by the variable fast-sweep deflecting wave $f-g$.

A finer adjustment will permit the operator to align the A and B pulses so that the time elapsed between the start of the respective fast sweeps and the corresponding pulses are equal and occurs during the expanded parts of the traces, thereby providing good accuracy for determining the time delay.

In the present present system, after the A and B pulses have been aligned with the receiver switched successively to operating positions No. 1, No. 2, and No. 3, the desired time difference or time interval is read off the delay switches 1D, S2D, S3D, S4D, and S5D (Figures 1 and 3) which indicate, respectively, microseconds in units, tens, hundreds, thousands and multiples of ten thousand. The time interval thus obtained is the amount that the starting time $t$ of the variable index marker has been delayed in time with respect to the mid-period $d'$ (Figure 5) of the deflecting wave cycle in order to align the A and B pulses.

It may be noted that the upper fast trace $h-i$ (illustrated in Figure 8) is produced by the first fast-sweep wave $h-i$ of the deflecting wave W. The lower fast trace $f-g$ (Figure 8) is produced by the second fast-sweep wave $f-g$ of the deflecting wave W.

GENERAL DESCRIPTION OF CATHODE RAY TRACE PRODUCING CIRCUITS

Referring to Figure 1 and to the graphs of Figure 5, the output of the pulse generator 49 is supplied over a conductor 61a to a slow-sweep deflecting circuit 115 for producing a sawtooth voltage wave X.

The output of the divider 17 is a rectangular voltage wave which appears unchanged at the output of a cathode-follower tube 18 as the wave C.

To produce the fast-sweep wave $h-i$ of deflecting wave W (Figure 5), the wave C is supplied over a conductor 198 to a differentiating circuit 105 to produce a pulse 105A. The pulse 105A is also utilized as the fixed index marker of the wave V.

The circuit for producing the variable index marker of wave V comprises the counter chain, the delay line DL and the associated delay switching, the said marker being obtained from the adjustably delayed pulse U taken from the delay line DL by way of the switch 1D. The delay line DL has delayed pulses supplied to it from the gate No. 2 as described hereinafter, the delay line providing the final precise delay in steps of one microsecond units. It is the wave U that controls the timing of the adjustable fast-sweep portion $f-g$ of wave W.

The delayed pulse U is supplied over a conductor 119 to the mixer 106. The mixed waves U and 105A pass through a clipper 121 and appear as the wave V which drives the fast-sweep deflecting circuit 122 to produce the wave W.

When the system is in the No. 1 operating position, the fixed and adjustable index marker pulses of the wave V are applied to the vertical deflecting plate 368 of the indicator tube 139 through a lead 383, a switch 350, a resistor 384, and a lead 381.

*Description of mixer 106, etc.*

Referring to Figures 1 and 11, the mixer circuit 106 and the clipping circuit 121 function to clip off the negative pulses of the wave 105A and to mix the remaining clipped positive pulses with the pulses U. Thus, the wave V is obtained at the output of the clipper-mixer combination. The mixer 106, which may consist of two vacuum tubes having a common anode resistor as shown in Figure 11, reverses the polarity of the pulses. The waves in the plate circuit of the mixer 106 are of equal amplitude due to operation of the tubes in a condition where grid and plate voltage approach equal amplitude. The width of the applied pulses U and 105A is short compared to that of the plate pulses, the width of the latter being controlled by a capacitor-resistor combination in the plate circuit and therefore being independent of the width of the incoming wave. This capacitor-resistor combination comprises a capacitor C1 and the plate resistor R1.

The wave V is supplied to the fast-sweep deflecting circuit 122 shown in detail in Figure 11 and described hereinafter. The narrow negative pulses of wave V produce the fast-sweep wave W having the useful deflecting portions h—i and f—g. The deflecting waves W and X are applied from the circuits 122 and 115 through a wave-selecting switch 123 and through a horizontal deflecting amplifier 124 to the horizontal deflecting plates 138 of the cathode-ray indicator tube 139. As described in copending application Serial No. 589,320, now Patent No. 2,445,361, issued July 20, 1948, filed April 20, 1945 in the names of Garrard Mountjoy, George D. Hulst, Jr. and Earl Schoenfeld and entitled Radio Navigation System, the horizontal deflecting amplifier 124 may be provided with a switch (not shown) for changing the bias on the amplifier tubes when the function switch is changed from the slow-sweep position to the fast-sweep position and vice versa, thereby insuring optimum efficiency and undistorted gain from the amplifier tubes.

The switch 123, which is one of the function switches, has three contact points and three corresponding switch positions, referred to as operating positions, which are identified, reading clockwise, as positions No. 1, No. 2, and No. 3.

There are several other operation position or function switches, described hereinafter, that likewise have these three switch positions and which are ganged with the switch 123.

Switch 123, when in operation position No. 1, functions to apply the slow-sweep wave X to the horizontal deflecting plates 138 and, when in operation positions No. 2 and No. 3, functions to apply the fast-sweep wave W to the deflecting plates 138.

The fast-sweep deflecting circuit 122 that is driven by the wave V (comprising the fixed and variable marker pulses) to produce the fast-sweep wave W will now be described with reference to Figure 11.

The fast-sweep circuit

Referring more specifically to the circuit 122 for producing the fast-sweep wave W, as shown in Figure 11, the circuit comprises a vacuum tube 316 and a pulse-shaping network that comprises two sections consisting of cathode resistors 331 and 332 shunted by capacitors 333 and 334, respectively, identified as network sections 317a and 317b. The shaping network further comprises a delay line section 317c comprising series resistors 336 and shunt capacitors 337 connected across the cathode resistor 331 and terminated in a resistor 338 and in the cathode resistor 332. The fast-sweep wave W is taken off the resistor 338 through an adjustable tap 339, the setting of which determines the amplitude of the wave W.

In operation, the capacitors of the network sections 317a and 317b are charged through the anode resistor 341 and the tube 316 to a certain voltage level between successive pulses of the wave V to bring the tap 339 to the voltage $e_1$ (Figure 5). Upon the occurrence of each negative pulse of the wave V, the tube 316 is driven to cut-off and the capacitors 333 and 334 discharge through the resistors 331 and 332, respectively. The section 317a comprising capacitor 333 and resistor 331 has a fast time constant whereby the discharge of capacitor 333 produces a voltage of steep slope across resistor 331. The section 317a comprising capacitor 334 and resistor 332 has a slower time constant whereby the discharge of capacitor 334 produces a voltage of less slope across resistor 332. These two voltages of different slopes appear at the tap 339 as the sum of the two voltages with the voltage of the steeper slope slightly delayed by the delay network section 317c.

The wave form of the wave W following the said slight delay is approximately logarithmic.

It should be understood that the fast-sweep wave W need not be of the wave form described and, in fact, may be linear.

The above-described fast-sweep deflecting circuit is described and claimed in application Serial No. 583,255, now Patent No. 2,463,969, issued March 8, 1949, filed March 17, 1945 in the name of George D. Hulst, Jr. and entitled Cathode Ray Deflection Circuit.

As previously noted, the starting time $t$ of the fast-sweep wave f—g is determined by the adjustment of the pulse U (and in turn by the variable index marker of wave V) whereby the start of the wave f—g may be made to precede the received B pulse by the same amount that the start of the wave h—i precedes the received A pulse, this being the condition of alignment of the A and B pulses. It should also be noted that the wave f—g is identical with the wave h—i whereby exact alignment of the A and B pulses on the cathode-ray traces is obtained (as shown in Figure 9) when the above-described timing relation exists.

An improved fast-sweep circuit described and claimed in copending application Serial No. 674,184, now Patent No. 2,449,169, issued September 14, 1948, filed June 4, 1946 in the names of Paul F. J. Holst and Loren R. Kirkwood and entitled Deflecting Circuits, may be employed if desired.

The slow-sweep circuit

Referring more specifically to the slow-sweep deflecting circuit 115, as shown in Figure 10, it comprises a vacuum tube 318 and a network in the cathode circuit that comprises a cathode resistor 342 that has an adjustable tap 344 thereon and which is shunted by a capacitor 345. Positive bias is applied to the cathode of the tube 318 by connecting the lower end of cathode resistor 342 to the junction point of a pair of bleeder resistors 319 and 320. This prevents the tube 318 from drawing current at the end of the sawtooth cycle so that flattening of the sawtooth wave is avoided. The operation is as follows: Each time one of the positive 20,000 $\mu$s. pulses from the lead 61a is supplied to the grid of the tube 318 by way of a coupling capacitor 321, the capacitor 343 is charged suddenly from the anode voltage supply through the tube 318 to a certain voltage level to bring the tap 344 to the voltage level $e_2$ (Figure 5). At the end of each positive pulse, the capacitor 343 discharges slowly through the resistors 342 and 319 thus producing successively the slow-sweep sawtooth wave portion a—b and the sawtooth wave portion c—d at the tap 344.

In Figures 10 and 11, the values of certain circuit elements have been indicated, merely by way of example, in ohms, megohms, microfarads and micro-microfarads.

THE RADIO RECEIVER

The A and B pulses from a pair of ground stations (Figure 4) are received by a radio receiver of the superheterodyne type comprising a radio frequency amplifier indicated at 361, a converter 362, an I.-F. amplifier 363 and a second detector and video frequency amplifier 364. The A and B pulses are supplied with positive polarity over a conductor 366, a conductor 381 and a capacitor 382 to the upper vertical deflecting plate 368. Thus, the A and B pulses may be made to appear, as shown in Figures 7, 8 and 9, on the horizontal cathode-ray traces. The A and B pulses are made to appear with equal amplitude on the cathode-ray tube screen by employing a differential gain control circuit described hereinafter.

Slow-Sweep and Fast-Sweep Trace Separation

The slow-sweep traces a—b and c—d are separated as illustrated in Figure 7 while the receiver is on the No. 1 operation position by means of the rectangular wave C (Figure 5) supplied from the cathode follower tube 18 (Figure 1) over a conductor 369 to the No. 1 contact point of a trace separation switch 371, and over a conductor 372 to the upper deflecting plate 368 of the cathode-ray tube 139. Thus, the portion of the wave C, which is positive as it appears on the upper plate 368, holds the cathode-ray deflection up a certain amount during the occurrence of the slow-sweep deflecting wave c—d.

The fast-sweep traces f—g and h—i are separated as illustrated in Figure 8 during the No. 2 operation position also by means of the rectangular wave C.

Fast-Sweep Blanking

Blanking is provided so that only the traces f—g and h—i appear on the cathode-ray screen when in the No. 2 and No. 3 fast-sweep operating positions. This blanking is provided by means of the negative portions of the wave Y as it appears on the anode of the tube 316 (Figure 11) of the fast-sweep deflecting circuit 122. The wave Y is supplied from the anode of tube 316 to the No. 2 and No. 3 contact points of a switch 321 whereby in the No. 2 and No. 3 operation positions, this wave is supplied over conductors 322 and 326 to the grid 327 of the cathode-ray tube 139.

Trace Brilliance Control

The diode 324 is provided to control the brilliance of the traces on the cathode-ray tube screen by preventing changes in bias on the cathode-ray tube grid 327 due to the application of blanking pulses. A leak resistor 328 is connected across the diode 324 and the cathode of the diode 324 is connected to a variable bias voltage source (not shown).

In operation, during the periods that the blanking waves are positive at the anode of the diode 324, the impedance of the diode 324 is very low so that its anode is practically at the bias potential of its cathode. Thus, regardless of the form of the blanking wave and regardless of whether any blanking wave is being applied, the voltage on the grid 327 of the cathode-ray tube during the cathode-ray sweeps is substantially the voltage on the cathode of the diode 324.

Differential Gain Control Circuit

A differential gain control circuit for the R.-F. amplifier 361 of the radio receiver preferably is provided, as shown in Figure 1, for the purpose of keeping the amplitudes of the A and B pulses substantially alike at the receiver output, thus facilitating the A and B pulse alignment. The gain control circuit includes a resistor 343 connected between the anodes of the two tubes of the last multivibrator in the final divider 11 (Figures 1 and 2). An adjustable differential gain balance tap on resistor 343 may be moved to either side of the center thereof to decrease the gain of the R.-F. amplifier 361 during either the reception of the pulse A or the pulse B. The voltage at the gain balance tap is supplied through a lead 340, a capacitor 344 and a resistor 346 to the anode of a diode 347 and to the No. 2 and No. 3 contact points of a differential gain control switch 348. Thus, when the receiver is on either the No. 2 or No. 3 operation position for pulse alignment on the fast sweeps, the differential gain control voltage is applied through the switch 348 and a conductor 349 to the gain control grid of an amplifier tube in the R.-F. amplifier 361.

The differential gain control operation with the receiver on either No. 2 or No. 3 operation position is as follows:

When the gain balance tap is at the center of resistor 343, no voltage wave is applied to the diode 347. When the tap is on one side of this center or balance position, a wave of one polarity is applied to the diode 347; when the tap is on the other side of the balance point, a wave of the opposite polarity is applied to the diode 347. The diode 347 functions to supply a negative bias during the negative half-cycle following a positive cycle of an applied wave. For example, a positive half-cycle causes diode current to charge capacitor 344, and during the following negative half-cycle the capacitor 344 discharges slowly through a resistor 351 connected across the diode 347 thus making the anode of diode 347 negative with respect to ground and reducing the gain of the R.-F. amplifier 361 while the B pulse (or the A pulse) is being amplified.

With switch 348 on the No. 1 operation position for pulse alignment, normal operating bias voltage —V is on the R.-F. amplifier 361.

Detailed Description of Counter Chain and Switching of Figures 3 and 3A

Figure 3A:
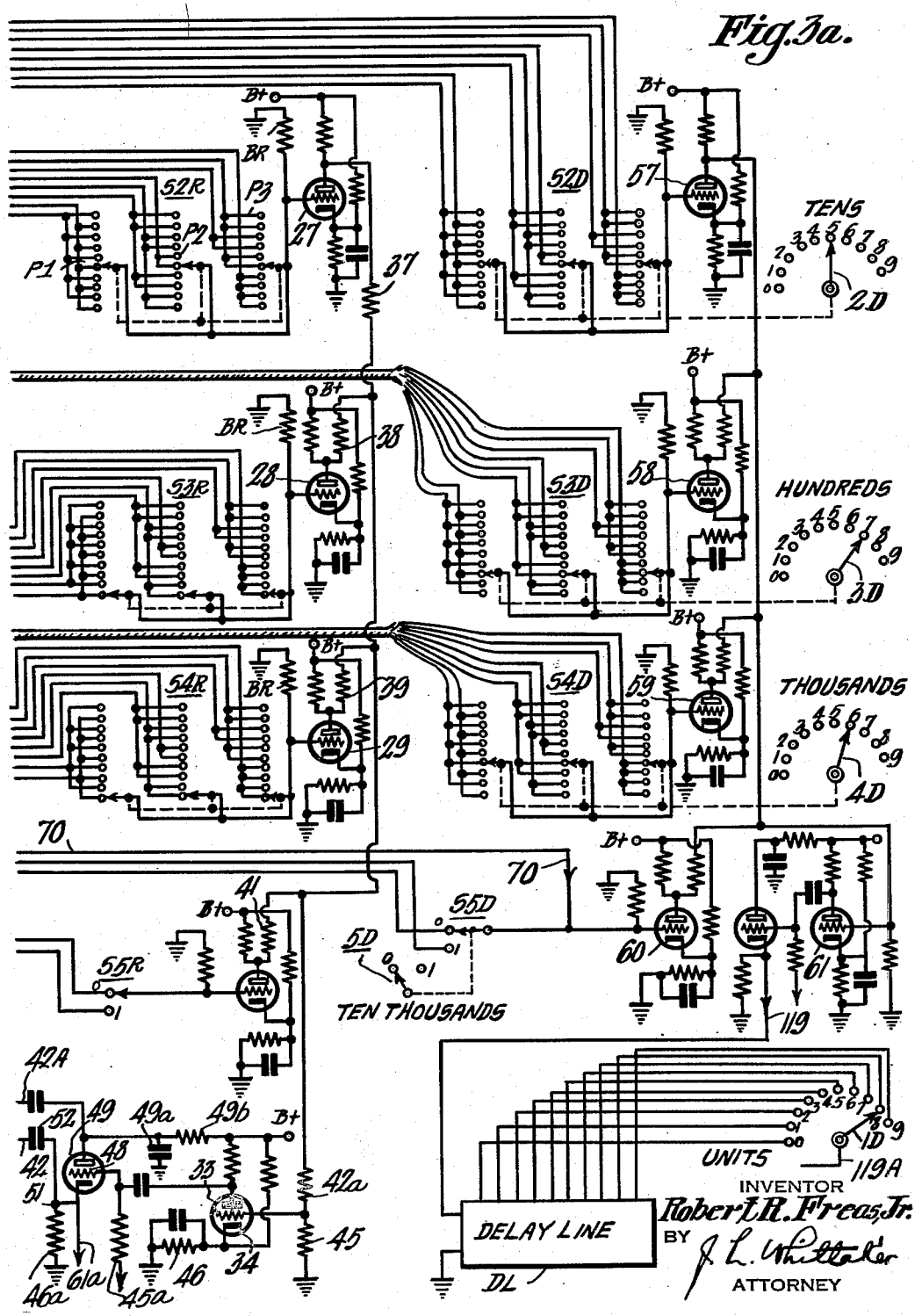

A more detailed description will now be given describing the system of counters, switches and gates for obtaining pulses of the desired repetition rate and of the desired delay. The specific system shown in Figures 3 and 3A provides eight different repetition rates of 40,000 μs.; 39,900 μs; 39,800 μs., etc. for selecting any one of eight pairs of stations according to the settings of switches S2R, S3R, etc. As to the pulse delay, this particular system delays a pulse from 0μs. to over 19,000 μs according to the settings of switches ID, S2D, S3D, etc.

Referring to Figures 3 and 3A, the chain of counters, the repetition rate switching, the delay switching, and the gating or coincidence circuits are shown in detail by way of example. The first decade counter, which is identified as counter No. 2 to facilitate comparison with the above-mentioned Woodward application, consists of multivibrator-like locking stages comprising double triodes V1, V2, V3 and V4. These stages each have two positions of rest at one or the other of which they stay locked, when tripped thereto, until some applied voltage or current trips them again to lock them in the other position. In the embodiment shown, application of negative voltage to the anodes and thence to the grids of the locking circuit tubes will reduce current in that tube drawing current and start the tripping action which switches the current through the other tube. Decade counters No. 3 and No. 4 are similar and to simplify the diagram have been illustrated by rectangles. The frequency divider or counter No. 5 is illustrated in detail and comprises only two multivibrators M1 and M2 since it divides by 4. The multivibrators in this counter are similar to those employed in the decade counters. However, the first stage M1 is the final stage of the counter chain. The second stage M2 has no reset pulse applied to it and it does not supply any pulse to the coincidence tube of the repetition rate system as will be apparent from the following description.

The repetition rate switching

Associated with each decade counter is a three-pole, ten-position switch (Figure 3) for determining the pulse repetition rate. These switches are referred to as S2R, S3R, and S4R. While ten switch positions are shown for clearness of explanation, not all of them are useful in selecting the eight stations in the example described. There is also a single-pole two-point switch S5R for the binary counter M1.

The switches S2R, S3R, S4R, and S5R and the contacts thereof are coupled to the anodes of the locking circuit tubes whereat the potentials rise and fall depending on which tube of the pair is drawing current. For example, the anode V1A of the left-hand or A section of the tube V1 is connected to alternate contacts of pole P1 of the three-pole switch S2R. The anode V1B of the right-hand or B section of tube V1 is connected to the remaining contacts of this pole. The anodes V2A, V2B, and V3B of tubes V2 and V3 are connected to staggered pairs of contacts of the second pole P2, etc. The basic details of each decade and how it operates is covered fully in Grosdoff application Serial No. 580,446, referred to above and consequently, no detailed explanation will be given here. Associated with the binary M1 of counter No. 5 is the single-pole two-position switch S5R that functions with switches S2R, S3R, etc. for determining the repetition rate. Although not so illustrated, the switches S2R, S3R, etc. preferably are ganged so as to be operated by a single station selection knob.

The basic purpose of the counter circuit is to produce output pulses after the counters have counted a predetermined number of master oscillator cycles or pulses. The start of the counting is controlled by a gate circuit No. 1 (Figure 1) and comprising tubes 27, 28, 29, 30, and 34 (Figure 3A) as will be explained later. The development of the counter chain output pulses that are to be produced after the predetermined count has been reached is obtained by combining the proper voltages from the anodes of certain tubes in all four counters. For example, to select station L1 the repetition period of the last multivibrator M2 of counter No. 5 is made 39,900 microseconds. Since the first stage M1 of counter No. 5 is the final one in the counter chain to be reset, as explained hereinafter, the desired result is obtained by making the repetition period of its output wave D (Figure 5) one-half the said period of 39,900 $\mu$s or 19,950 $\mu$s. Therefore the switch S2R on counter No. 2 is set on position 5 which is the tens count, switch S3R on counter No. 3 is set on position 9 which is the hundreds count, switch S4R on counter No. 4 is set on position 9 which is the thousands count, and switch S5R on counter No. 5 is set on position 1 which is the ten thousands count.

The voltage pulses collected by the switches are combined by means of four vacuum triodes 27, 28, 29, and 30. The tubes are in conventional circuits including grid leak resistances BR connecting the switches to ground. Each triode is biased by means of a voltage drop across a by-passed cathode resistor. This combination of pulses is obtained by the connections of said switches to the control grids of these four tubes. The anodes of the tubes are connected together to produce a single pulse, which represents the sum of the collected pulses, and feeds the same by way of resistors 37, 38, 39 and 41 and common resistor 42a to the grid 33 of a final combining or coincidence tube 34. The tube 34 is connected in an amplifier stage with its grid grounded by a resistor 45 and its cathode grounded by a resistor 46 and its anode connected to the plus terminal of a direct current source. The anode of amplifier tube 34 is coupled by a capacitor 47 to the control grid 48 of an output or reset pulse generator tube 49, the purpose of which is to deliver the combined or output pulse of positive polarity to all of the tubes in all of the decade counters and to the tubes in the binary counter M1 to trip the same back to their starting position for successive operation of the counter chain, and also to deliver a pulse of the desired repetition rate to the slow sweep generator by way of the lead 61a. A negative bias voltage is applied to the grid 48 of tube 49 through a resistor 45a. Also, as previously mentioned, the reset pulses are utilized for right drift and negative pulses from tube 49 are utilized for left drift.

Referring to decade counter No. 2 which has its switch S2R set at position 5, it is noted that for each position of the switch, a different combination of voltages from the eight tubes of the counter are used as explained in the Grosdoff application Serial No. 580,446. The voltage on the switch S2R as applied to the grid of tube 27 reaches a certain maximum positive value only when the count is at the value for which the switch position is set and the final desired output pulse applied to the grid of tube 34 is obtained only when the proper combination of voltages occurs simultaneously on the selected tubes of all four counters. For example, in decade counter No. 2 on the count of 5, the voltages selected by switch S2R are those at the anodes of tubes V1B and V3B and V4A. This combination of three voltages raises the control grid of tube 27 above its cut-off point so that conduction is initiated in tube 27 and the potential on its anode and at resistor 37 falls. The procedure for selecting voltages by the switches will be understood by referring to the graphs of Figure 6.

Figure 6:
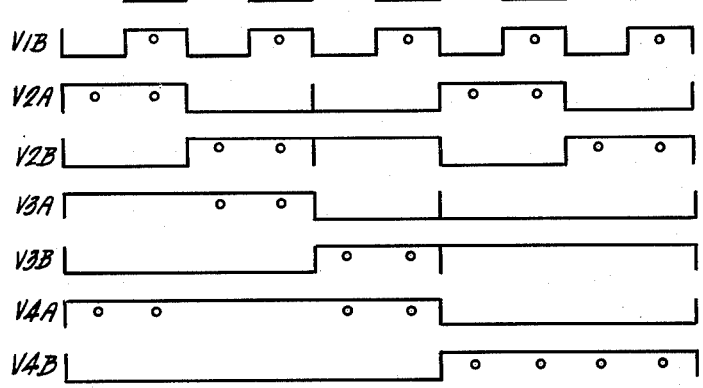

The several graphs of Figure 6 show the voltages appearing at the several anodes of the tubes V1, V2, etc. The graph identified as V1A shows the voltage on the anode of the left-hand or A section of tube V1A, for example. The disymmetrical characteristic of the graphs for the tubes V2 and V3 results from the feedback employed to obtain a decade count as explained in Grosdoff application Serial No. 580,446. The dots indicate the plates that are selected to obtain a given count. For example, the anodes V1A, V2A, and V4A are connected to switch points 0 to obtain the count 0 when the switch is set on said points 0. A similar action takes place in tubes 28, 29 and 30 when the proper voltages are obtained by the settings on switches S3R, S4R, and S5R. When the final pulse which represents the final combination of voltages from the tubes 27, 28, 29, and 30 is reached, the voltage applied to the control grid of tube 34 is reduced (negative)

to such a point that conduction in the tube 34 is cut off. This action occurs suddenly at the instant the counters of the counter chain reach the number or count for which the switches have been set. Also the tubes 27, 28, and 29 may be made conductive several times during the process of the count, yet the combined voltage applied to the grid of tube 34 is never sufficiently negative to cut this tube off until the time occurs when tubes 27, 28, 29 and 30 are simultaneously conductive, this point being when the counter chain has reached the predetermined count for which it is adjusted.

At the instant when the counter chain produces its output pulse at the plate of tube 34, this output pulse is applied to the pulse generator tube 49 which preferably is a vapor tube such as a Thyratron so that a large current output is obtained at the output terminal 51 of the load resistor 46a. Preferably, the tube 49 discharges a capacitor 49a which receives a charge from the B+ source through a resistor 49b. Thus a high energy output pulse is produced. From terminal 51 the pulse is applied by way of condenser 52 and lead 42 to reset the counters of the counter chain back to the zero or starting position. This resetting function is accomplished by application of the output pulse, which is positive in polarity, to the grid circuits of all the tubes in the counters which draw current in the starting position. As previously stated, the reset pulse is not applied to the multivibrator M2 of the frequency divider 17.

The reason for not applying a reset pulse to the multivibrator M2 is that it must supply a symmetrical square wave (wave C in Figure 5) just as in the case of the Eccles-Jordan oscillator shown in Minneman application Serial No. 744,239. Furthermore, there is no necessity for apply a reset pulse to this last multivibrator for changing the repetition period. This will be understood from the following.

If the desired repetition period of the wave C (Figure 5) from the last multivibrator M2 is to be 39,900 μs., it is only necessary to make the repetition period of the wave D (Figure 5), from the preceding multivibrator M1 19,950 μs. since the last multivibrator divides by 2. This, of course, is accomplished by the resetting action described. Similarly, for any other repetition period, the switches S2R, S3R, etc. are set to give the desired repetition period for the output wave D of the first multivibrator M1 of counter No. 5, which repetition period is one-half that of the output wave C. For the particular example assumed, the different switch settings for selecting eight different pairs of stations L0, L1, L2 etc. may be charted as follows:

supplied to vacuum tubes 57, 58, 59, and 60 which comprise the gate circuit No. 2 (Figure 1). These tubes and their associated circuits correspond to the tubes 27, 28, 29, and 30 and their associated circuits previously described.

The coincidence tube 61 (to which the outputs of tubes 57 to 60 are applied) and the Thyratron tube 62 correspond to the tubes 34 and 49, respectively, of the repetition rate switching circuit. Delayed pulses appear on the lead 119.

The setting of switch S2D determines the delay in tens, and the settings of switches S3D, S4D, and S5D determine the delay in hundreds, thousands, and tens of thousands, respectively. For example, if the delay switches S2D, S3D, S4D, and S5D are on positions 5, 7, 6, and 0, respectively, as illustrated, when pulse alignment on the cathode-ray tube screen is obtained, then the reading from these switches is 6750 microseconds, there being no microsecond unit reading so that the last figure is zero. For convenience in setting the delay switches S2D, S3D, etc., their ganged switch arms preferably are operated by rotatable knobs 2D, 3D, etc. which carry pointers that indicate the delay setting.

To determine the delay in one microsecond units the pulses from the tube 62 (delayed to within ten microseconds of the desired delay) are applied by way of lead 119 to the delay line DL which provides a delay of one microsecond per section. The line DL may be of the conventional π section type suitably terminated in a resistor TR to make it non-reflecting.

Taps are taken off the input end of the line DL and off the end of each section and connected to the switch contact points of the switch 1D. The contact points are numbered 0 to 9 to indicate microsecond units. The final delayed pulse is taken off the switch arm of switch 1D by the lead 119A.

It will be apparent that with the switches 1D to 5D on positions 8, 5, 7, 6, and 0 as illustrated, the pulse appearing on lead 119A is delayed 6758 microseconds, the unit reading being obtained by means of delay line DL.

This reading of 6758 microseconds locates one of the navigation or "loran" lines of position on the map prepared for use with the equipment.

Instead of tapping a delay line or network, a pick-up electrode may be associated with the delay line so that it has capacity to different points in the network as the electrode is moved.

The present invention is not limited to the use of a particular kind of delay network or delay means or to any particular way of taking the delayed pulses off the delay network.

While the use of an electrical delay line is preferred because of its reliability and simplicity,

REPETITION RATE SWITCHING

| Station Repetition Rate | L0 | L1 | L2 | L3 | L4 | L5 | L6 | L7 |
|---|---|---|---|---|---|---|---|---|
|  | 20,000 | 19,950 | 19,900 | 19,850 | 19,800 | 19,750 | 19,700 | 19,650 |
| S2R | 0 | 5 | 0 | 5 | 0 | 5 | 0 | 5 |
| S3R | 0 | 9 | 9 | 8 | 8 | 7 | 7 | 6 |
| S4R | 0 | 9 | 9 | 9 | 9 | 9 | 9 | 9 |
| S5R | 2 | 1 | 1 | 1 | 1 | 1 | 1 | 1 |

*The delay switching*

The delay switches S2D, S3D, S4D, and S5D are similar to the switches illustrated for determining the repetition period and they are connected to the chain of counters in the same way. The voltages taken off the delay switches are other suitable delay means are well known in the art. There may be mentioned, by way of example, delay multivibrators and phantastron delay means.

Figure 5:
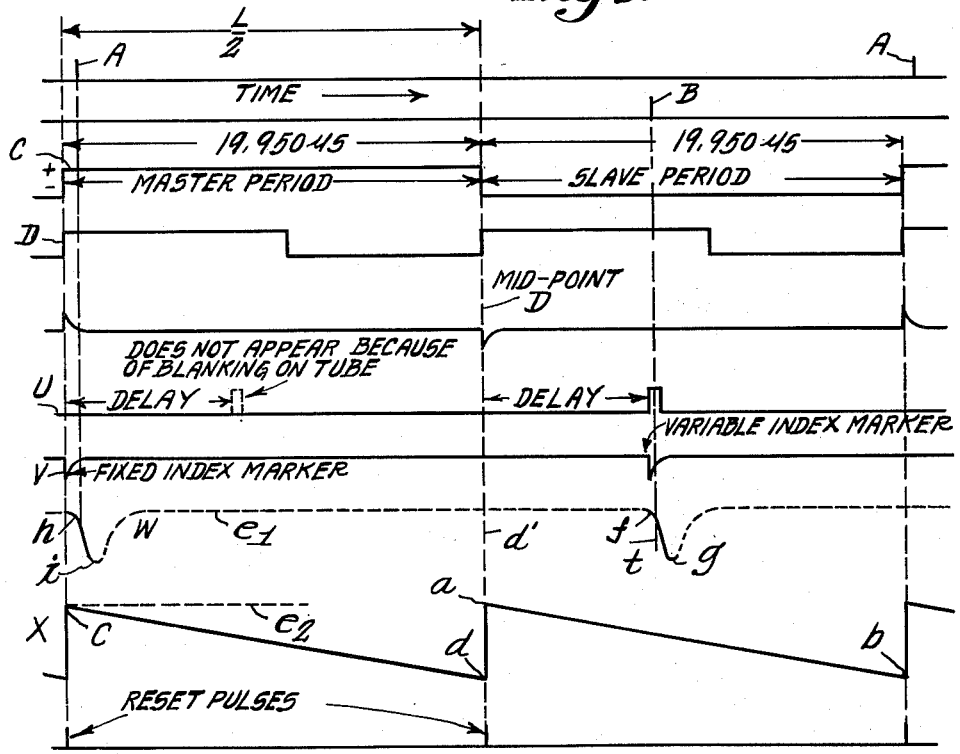

It will be noted that since the last counter stage supplying pulses to the gate tube 60 is the binary M1, the coincidence tube 61 would supply output pulses of a repetition period of 20,000 μs. or less, depending on the selected repetition period, in the absence of some further circuit action. Double this repetition period is desired, of course, for driving the fast-sweep circuit to obtain the adjustable fast trace *f—g* (Figure 5). The desired repetition period is obtained by, in effect, blanking out alternate pulses as indicated in Figure 5 so that only the 40,000 μs. repetition period pulse U appears on the lead 119 and, therefore, on the lead 119A.

This blanking effect is obtained by applying to the grid of gate tube 60 by way of a lead 70 a square wave from the last multivibrator M2. This wave is the same as wave C (Figure 5) except that it is of the opposite polarity, being taken off the opposite side of M2 from the side supplying the wave C. Thus, the grid of tube 60 is held negative during the "master period" (see Figure 5) whereby the pulse from the binary M1 cannot pass through tube 60 during said period.

The amount a pulse is delayed is not affected by changes in the pulse repetition rate because the amount of delay is less than the shortest repetition period. In the present example, the maximum delay desired from the point of measurement (mid-point *d*, Figure 5) is less than 19,650 μs. which is the shortest repetition period of the wave D. The resetting action is the only thing that would affect the delay and this does not occur until the counters have operated for more than the desired period of delay without any loss of count due to resetting.

The delay switch settings obviously do not affect the repetition rate since they do not affect the resetting circuit.

It will be apparent that the system of counters, switches, gate tubes, coincidence tubes and delay line described herein for obtaining pulses of selected repetition rates and selected delays is of general application and is not limited to its use in navigation apparatus. For general application it probably would be desired to omit the lead 70 so that there would be no blanking action. In that case the output pulse on lead 119A would have a repetition period of 20,000 μs. or less as desired and the amount of the delay would be measured from the time of occurrence of any reset pulse, not just from the reset pulse occurring at the mid-point *d* as in the navigation system application.

The Left-Right Drift Switching Circuits

Left drift circuit

The left drift switching circuit will now be described more in detail with reference to Figure 2 where it is identified as the circuit LDS enclosed by a broken line block. The 100 kc. oscillator 10 supplies a sine wave signal 400 through a coupling capacitor 401 to the grid of a vacuum tube VA provided with a grid leak resistor 402.

The negative pulse 403 for actuating the left drift is supplied from the reset pulse generator 49 (Figure 3A) by way of lead 42A to the switch arm 404 of the left drift switch 406. The switch 406 has three positions, the left position L being for left drift action, the center position is for no drift action, and the right position R is for the right drift action which is obtained by means of other ganged switches in the circuit RDS described hereinafter.

When the left drift switch 406 is in the left position, the negative pulse 403 is applied through a capacitor 407 to the grid of the tube VA. During a period controlled by the negative pulse 403, the signal 400 from oscillator 10 is prevented from passing through the tube VA. This is indicated by the graph 408. The length of time the tube VA cannot pass signal is determined by the R. C. circuit comprising capacitor 407 (in the case of slow drift) and the grid leak resistor 402. The R. C. circuit 407, 402 acts as a differentiating circuit to differentiate the negative pulse 403 and thereby obtain from the front edge of pulse 403 the pulse portion of wave 408. The differentiated pulse is much shorter than pulse 403, a fact that is not evident from the drawing since the graphs 403 and 408 are drawn to different time scales. Slow drift is alway obtained when the function switches are in either position No. 2 or No. 3.

The tube VA is always biased off sufficiently to permit passage of only the positive peaks of the sine wave 400 as indicated by the clipping level shown in graph 408. This biasing is of the grid leak biasing type, the coupling capacitor 401 receiving a charge periodically from grid current flow.

The output pulses from tube VA cause periodic damped waves 409 to appear across a resonant coil 411 in the plate circuit of the tube. The frequency of the damped oscillations is the resonant frequency of the coil 411. The wave trains occur at the frequency of oscillator 10.

The damped wave trains 409 are passed through a clipping tube VB so that only the most positive peak of each wave train appears in the output of tube VB. These peaks appear as negative pulses as shown at 416 and are supplied over the lead 417 to the input circuit of the decade counter 13. The circuit comprising the tubes VA and VB connecting the oscillator 10 to the decade counter 13 may be referred to as a signal translating circuit.

Fast Left Drift is obtained if the function switch is on position No. 1. One of the function switches is shown at 418. If it is on No. 1 position, it connects a capacitor 419 in parallel with capacitor 407 thereby increasing the time constant of the R. C. circuit. This lengthens the biasing off effect of the negative pulse 403 to increase the number of pulses that are not passed by the tube VA.

From the foregoing description, it will be seen that by means of the left drift circuit the period of the loran timer cycle (the period of the pulses on lead 61a (Figure 3A) for example, that drive the slow sweep circuit) may be increased to obtain the left drift effect. The said period is increased by the described action since for a short interval the counter chain fails to receive pulses for operating the counter.

The amount that said period is increased is not limited to these values, but in the present example there is about a 100 microsecond increase for the fast drift and about a 10 microsecond increase for the slow drift.

Right drift circuit

Reference will now be made to the right drift circuit shown in Figures 2 and 3. In Figure 2 the switching for this circuit is enclosed by a broken line rectangle RDS. Right drift switches are shown at 421, 422 and 423. These switches are ganged with the left drift switch 406. Two function switches shown at 424 and 426 are ganged with the function switch 418. It will be understood that all function switches in the system preferably are ganged together.

The right drift action requires a decrease in the period of the loran timer cycle. In the present example this is a 10 microsecond decrease for the slow drift and a 100 microsecond decrease for the fast drift.

In the case of the slow drift this is accomplished by resetting the counter chain to a count of one (i. e. to 10 microseconds) instead of to zero, and in the case of the fast drift by resetting it to a count of ten (i. e. to 100 microseconds) instead of to zero.

By referring to Figure 3 it will be seen that except for the first counter stage of the counter decade No. 2 and the first counter stage of the counter decade No. 3, all stages of the several counters receive reset pulses in the same way as described in the above-mentioned Woodward application, that is, the positive reset pulses are applied to the "A" side of the counter tubes.

In the case of the first stages of counter decades No. 2 and No. 3, according to the present invention, provision is made for applying the positive reset pulse from lead 42 either to the "A" section of the counter tube (in which instance there is no right drift) or to the "B" section of the counter tube (in which case there is a right drift action).

In the case of slow right drift action where there is a 10 $\mu$s. decrease in the period of the timer cycle, the first stage of decade counter No. 2 is the only stage in the counter chain having the reset pulses applied to the "B" side of the counter tube. All other counter stages have the reset pulse applied to the normally reset side or "A" side of the counter tube.

In the case of fast right drift action where there is a 100 $\mu$s. decrease in the period of the timer cycle, the first stage of decade counter No. 3 is the only stage in the counter chain having the reset pulses applied to the "B" side of the counter tube. All other counter stages have the reset pulse applied to the normally reset side or "A" side of the counter tubes.

One switching arrangement for applying the reset pulses in the manner described above is illustrated by way of example. Referring to Figure 3, it will be seen that the leads for carrying reset pulses to the first stages of decades No. 2 and No. 3 go to the junction points of 33,000 ohm and 270 ohm resistors, the 270 ohm resistor being connected to ground. The resistance values are not critical but the value of the resistor connected to ground should be low with respect to the other in this particular switching arrangement so that there is effectively a ground connection on the side not receiving the reset pulses.

The reset pulse leads for the first stage of decade No. 2 are identified as leads 431 and 432. The reset pulse leads for the first stage of decade No. 3 are identified as leads 433 and 434.

Referring now to the drift switching shown in Figure 2, it is evident that with the switches 406, 421, 422, and 423 in the left drift position, the positive reset pulses should be applied to the "A" side of all tubes in the counter chain regardless of the position of the function switches. By tracing out the switching circuits it will be apparent that this result is obtained.

Specifically, the reset pulse from lead 42 goes through the switch 421 and over the lead 431 to the "A" side of tube V1 of decade No. 2. The reset pulse also goes through switch 422, over conductor 436 and over lead 433 to the "A" side of the tube (not shown) in the first stage of decade No. 3. It will be found that the leads 432 and 434 are open regardless of the position of the function switches 424 and 426. The same condition exists when the drift switches are in their center or "no drift" position.

Next consider the drift circuits when the drift switches 406, 421, 422, and 423 are in their right drift or R position. There is now no left drift action but there is either a fast right drift action or a slow right drift action depending upon the position of the function switches 424 and 426.

Assume the case of slow right drift where the function switches are in either No. 2 or No. 3 position and the drift switches are on the position R. Then the reset pulse from lead 42 goes to the "B" side of tube V1 of decade No. 2 to give a slow right drift. The reset pulse path may be traced from lead 42, through switch 422 and conductor 437 to contact R of switch 423, through switch 423 and a conductor 438 to the function switch 426, and through switch 426 and over lead 432 to the "B" side of tube V1.

It will be seen that at the same time the reset pulse from lead 42 goes to the "A" side of the first stage of decade No. 3. This reset pulse path may be traced from lead 42 through drift switch 422, over conductor 439, and through function switch 424 to the lead 433.

An inspection of the circuit will show that in this right drift switching position with the function switches on either position No. 2 or No. 3, the leads 431 and 434 are open.

Assume next the case of fast right drift where the function switches are on position No. 1 and the drift switches are on the position R. Then the reset pulse from lead 42 goes to the "B" side of the first stage tube of decade No. 3 to give a fast right drift. The reset pulse path may be traced from the lead 42 through drift switch 422, over conductor 437, through drift switch 423, over conductor 438, through function switch 426 and over the lead 434 to the "B" side of the first stage of decade No. 3.

It will be seen that at the same time the reset pulse goes to the "A" side of the tube V1 in decade No. 2. This reset pulse path may be traced from the lead 42, through drift switch 422, over conductor 439, through function switch 424, over conductor 451, and through lead 431 to the "A" side of tube V1.

An inspection of the circuit will show that for this fast right drift position of the switches the leads 432 and 433 are open.

It should be understood that my right drift circuit is not limited to the particular arrangement illustrated. If other rates of drifts are desired, for example, the drift switching may be applied to counter stages other than the first stages. It might be desirable to apply the slow and fast drift switching to different stages of the same counter decade.

Also, the drift switching need not necessarily apply the reset pulses to the "B" side of a counter stage to effect a right drift since a counter system may be designed so that the reset pulses are normally applied to the "B" side, i. e., so that the "B" side is the normally reset side for the condition of no drift. In that case the reset pulses would be applied to the "A" side of a stage to obtain right drift. The feature of importance is that to obtain right drift the reset pulses are applied to that side of a counter stage that is not the normally reset side.

PROCEDURE IN MAKING A TIME MEASUREMENT

The successive steps in making a measurement of the time interval between the A and B pulses from a pair of ground stations will now be described.

Alignment of A and B pulses
POSITION NO. 1

After a particular pair of ground stations has been selected with the receiver set on the No. 1 operation position of the function switches, the A and B pulses will appear stationary on the two traces a—b and c—d. The ganged drift switches 406, 421, 422 and 423 are operated to drift one of the pulses onto the upper trace c—d and over the fixed index marker at the left end of this trace. The other pulse will now appear on the lower trace a—b. The pulse on the trace c—d is the A pulse and the pulse on the trace a—b is the B pulse. That this is true will be evident by referring to the graphs of Figure 5.

Next, the starting time $t$ of the variable index marker of wave V is adjusted by setting the delay switch knobs 1D, 2D, etc. to bring the variable index marker under the B pulse. The variable index marker is now carefully adjusted so that its position with respect to the B pulse is substantially the same as the position of the fixed index marker with respect to the A pulse.

POSITION NO. 2

Next, referring to Figure 8, the receiver is switched by the function switches to the fast-sweep operation position No. 2 which results in the A and B pulses appearing on the traces h—i and f—g, respectively. As shown in Figure 5, the start of the variable index marker pulse of wave V determines the start of the second fast-sweep portion f—g of wave W, the two starting practically simultaneously. By operating the drift switches 406, 421, etc. (which now produce a slow drift), the A and B pulses are drifted to the left ends of the traces where they are on the more expanded portion of the fast sweeps. They are then closly aligned as shown in Figure 8 by operating one or more of the delay switch knobs 1D, 2D, etc.

POSITION NO. 3

The final alignment of the A and B pulses is done on operation position No. 3 with the two traces f—g and h—i superimposed as shown in Figure 9. The front edges of the A and B pulses are now exactly aligned, usually by operating only the switch knob 1D. The time reading can now be made from the settings of the delay switch knobs as shown by the positions of the pointers on the knobs 1D, 2D, 3D, 4D, and 5D.

For example, if the pointers of the switch knobs 1D, 2D, 3D, 4D, and 5D read 8, 5, 7, 6, and 0, respectively, the reading is 6758 microseconds.

I claim as my invention:

1. In combination, a system designed for producing repetitive pulses that may be produced at selected repetition rates, said system comprising a chain of counters of the type that must be driven to produce repetitive output pulses, a stable oscillator for supplying signal to the high frequency end of said chain of counters for driving said chain of counters, a signal translating circuit through which signal from said oscillator is supplied to said chain of counters; a drift control circuit comprising means connected to said translating circuit for blocking the passage of signal from said oscillator to said chain of counters for a predetermined period of time in response to the application of a certain polarity pulse thereto, and means for applying at will to said last means a pulse of said certain polarity which pulse occurs at the selected repetition rate whereby the repetition period of said output pulse is increased as a function of said predetermined period of time.

2. In a receiver for a radio navigation system, in combination, a system designed for producing repetitive pulses that may be produced at selected repetition rates, said system comprising a chain of counters of the type that must be driven to produce repetitive output pulses, a stable oscillator for supplying signal to the high frequency end of said chain of counters for driving said chain of counters, a signal translating circuit through which signal from said oscillator is supplied to said chain of counters; a drift control circuit comprising means connected to said translating circuit for blocking the passage of signal from said oscillator to said chain of counters for a predetermined period of time in response to the application of a certain polarity pulse thereto, and means for applying at will to said last means a pulse of said certain polarity which pulse occurs at the selected repetition rate and at the start of the cycle of counts whereby the repetition period of said output pulse is increased as a function of said predetermined period of time.

3. In combination, a system designed for producing repetitive pulses that may be produced at selected repetition rates, said system comprising a chain of counters of the type that must be driven to produce repetitive output pulses, each counter having a count-selecting means, a coincidence tube or circuit, means applying said selected counts from the counters of said chain to said coincidence tube whereby it passes an output pulse only in response to the selected counts from each counter occurring simultaneously, means for resetting said counters by said output pulse and at the same time restarting the cycle of operation of the counter chain whereby the repetition rate of said output pulse is determined by the count selection at each of the counters, a stable oscillator for supplying signal to the high frequency end of said chain of counters, a signal translating circuit through which signal from said oscillator is supplied to said chain of counters for driving said chain of counters; a drift control circuit comprising means connected to said translating circuit for blocking the passage of signal from said oscillator to said chain of counters for a predetermined period of time in response to the application of a certain polarity pulse thereto, and means for applying at will to said last means a pulse of said certain polarity which pulse occurs simultaneously with and at the same repetition rate as said resetting output pulse whereby the repetition period of said output pulse is increased as a function of said predetermined period of time.

4. In combination, a system designed for producing repetitive pulses that may be produced at selected repetition rates, said system comprising a chain of counters of the type that must be driven to produce repetitive output pulses, each counter having a count-selecting means, a coincidence tube or circuit, means applying said selected counts from the counters of said chain to said coincidence tube whereby it passes an output pulse only in response to the selected counts for each counter occurring simultaneously, means for resetting said counters by said output pulse and at the same time restarting the cycle of operation of the counter chain whereby the repetition rate of said output pulse is determined by the count selection at each of the counters, a stable oscillaor for supplying signal to the high frequency end of said chain of counters, a signal translating circuit through which signal from said oscillator is supplied to said chain of counters for driving said chain of counter; said translating circuit comprising a vacuum tube normally for passing signal from said oscillator, a differentiating circuit connected to the input circuit of said vacuum tube for biasing said vacuum tube beyond cut-off for a predetermined period of time in response to the application of a certain polarity pulse to said differentiating circuit, and left drift switching means for applying at will to said differentiating circuit a pulse of said certain polarity which pulse occurs simultaneously with and at the same repetition rate as said resetting output pulse whereby the repetition period of said output pulse is increased as a function of said predetermined period of time.

5. The invention according to claim 4 wherein means is provided for changing the time constant of said differentiating circuit whereby the repetition period of said output pulse may be increased either a comparatively small amount or a comparatively large amount at will.

6. In combination, a system that is designed for producing pulses having selected repetition rates, said system comprising a chain of counters, each counter having a count-selecting means, a coincidence tube or circuit, said selected counts from the counters of said chain being applied to said coincidence tube whereby it passes an output pulse only in response to the selected counts from each counter occurring simultaneously, means for resetting said counters by said output pulse and at the same time restarting the cycle of operation of the counter chain whereby the repetition rate of said output pulse is determined by the count selection at each of the counters, a stable oscillator connected to supply signal to the high frequency end of said counter chain; a drift circuit comprising switching means through which resetting output pulses are applied to one of said counters, and means including said switching means for selectively applying said last-mentioned output pulses either to a point in said one counter which resets said counter chain to zero or to a point in said one counter that resets said counter chain to a count other than zero whereby the repetition period of said output pulses may be decreased at will by a period of time corresponding to said count other than zero.

7. In combination, a system that is designed for producing pulses having selected repetition rates, said system comprising a chain of counters, each counter comprising a plurality of stages, each stage having one side that produces a voltage in the positive direction at the time its opposite side produces a voltage in the negative direction, each counter having a count-selecting means, a coincidence tube or circuit, said selected counts from the counters of said chain being applied to said coincidence tube whereby it passes an output pulse only in response to the selected counts from each counter occurring simultaneously, means for resetting said counters by said output pulse and at the same time restarting the cycle of operation of the counter chain whereby the repetition rate of said output pulse is determined by the count selection at each of the counters, a stable oscillator connected to supply signal to the high frequency end of said counter chain; a drift circuit comprising switching means through which resetting output pulses are applied to a stage of one of said counters, and means including said switching means for selectively applying said last-mentioned output pulses either to the normally reset side or to the other side of said last-mentioned stage whereby the repetition period of said output pulses may be decreased at will.

8. In combination, a system that is designed for producing pulses having selected repetition rates, said system comprising a chain of counters, each counter comprising a plurality of stages of the multivibrator type, each counter having a count-selecting means, a coincidence tube or circuit, said selected counts from the counters of said chain being applied to said coincidence tube whereby it passes an output pulse only in response to the selected counts from each counter occurring simultaneously, means for resetting said counters by said output pulse and at the same time restarting the cycle of operation of the counter chain whereby the repetition rate of said output pulse is determined by the count selection at each of the counters, a stable oscillator connected to supply signal to the high frequency end of said counter chain; a drift circuit comprising switching means through which resetting output pulses are applied to a stage of one of said counters, and means including said switching means for selectively applying said last-mentioned output pulses either to the normally reset side or to the other side of said last-mentioned stage whereby the repetition period of said output pulses may be decreased at will.

9. In combination, a system that is designed for producing pulses having selected repetition rates, said system comprising a chain of counters, each counter comprising a plurality of stages of the multivibrator type, each counter having a count-selecting means, a coincidence tube or circuit, said selected counts from the counters of said chain being applied to said coincidence tube whereby it passes an output pulse only in response to the selected counts from each counter occurring simultaneously, means for resetting said counters by said output pulse and at the same time restarting the cycle of operation of the counter chain whereby the repetition rate of said output pulse is determined by the count selection at each of the counters; a stable oscillator connected to supply signal to the high frequency end of said counter chain; a drift circuit comprising switching means through which resetting output pulses are applied to the first stage of one of said counters, and means including said switching means for selectively applying said last-mentioned output pulses either to the left side or to the right side of said first stage whereby the repetition period of said output pulses may be decreased at will by a period of time equal to the repetition period of the pulses appearing at the input circuit of said one counter.

10. In a navigation system receiver for receiving two time-spaced pulses that are transmitted in a predetermined time relation from two geographically-spaced stations, said receiver including a cathode-ray tube having a screen on which said pulses are to appear and having means for producing a cathode ray and directing it against said screen, a deflecting circuit for producing successive similar deflecting waves, means for deflecting said cathode ray successively by said deflecting waves and means for causing said time-spaced pulses to produce an indication on said screen during said deflections, means for controlling the repetition rate of said deflecting waves and for controlling the time at which alternate deflecting waves start whereby said time-spaced pulses may be aligned on said screen, said last means comprising a counter chain and repetition rate switching means and time relay switching means associated therewith for producing successive pulses of said selected repetition rate with alternate pulses having a selected delay, said successive pulses being applied to said deflecting circuit to produce traces on the screen during each of said time-spaced pulses whereby said selected delay may be made such as to align said two pulses on said screen; a stable oscillator for supplying signal to the high frequency end of said chain of counters, a signal translating circuit through which signal from said oscillator is supplied to said chain of counters, a drift control circuit comprising means associated with said signal translating circuit for blocking the passage of signal from said oscillator to said chain of counters for a predetermined period of time in response to the application of a certain polarity pulse thereto, and means for applying at will to said last means a pulse of said certain polarity which pulse occurs at the selected repetition rate whereby the repetition period of said output pulse is increased as a function of said predetermined period of time.

11. In a system for determining the time interval between two time-spaced pulses which recur at a certain repetition rate, said system including a cathode-ray tube having a screen on which said pulses are to appear and having means for producing a cathode ray and directing it against said screen, a deflecting circuit for producing successive similar deflecting waves, means for deflecting said cathode ray successively by said deflecting waves and means for causing said time-spaced pulses to produce an indication on said screen during said deflections, means for controlling the repetition rate of said deflecting waves and for controlling the time at which alternate deflecting waves start whereby said time-spaced pulses may be aligned on said screen, said last means comprising a counter chain and repetition rate switching means and time delay switching means associated therewith for producing successive output pulses of said selected repetition rate with alternate pulses having a selected delay, means for resetting said counters by the undelayed output pulses and at the same time restarting the cycle of operation of the counter chain, said successive output pulses being applied to said deflecting circuit to produce traces on the screen during each of said time-spaced pulses whereby said selected delay may be made such as to align said two pulses on said screen; a stable oscillator connected to supply signal to the high frequency end of said counter chain, a drift circuit comprising switching means through which resetting output pulses are applied to one of said counters, and means including said switching means for selectively applying said last-mentioned output pulses either to a point in said one counter which resets said counter chain to zero or to a point in said one counter that resets said counter chain to a count other than zero whereby the repetition period of said output pulses may be decreased at will by a period of time corresponding to said count other than zero.

12. In combination, a chain of counters, each counter comprising a plurality of multivibrators connected in cascade, each multivibrator comprising one stage of the counter, each counter having switching means connected to its multivibrators for selecting a desired count, a coincidence tube or circuit to which the selected counts from the counters are applied, said coincidence tube passing a signal only in response to all the counts applied thereto occurring simultaneously, means for applying the output pulse of said coincidence tube to said multivibrators to reset the counters and start the cycle of operation again whereby the repetition rate of said output pulse is determined by the switch selection of the counts of the counters in said chain; each counter having additional switching means connected to its multivibrators for selecting a desired count, a coincidence tube or circuit to which the counts selected by said additional switching means are applied, said last coincidence tube passing a signal only in response to all the counts applied thereto occurring simultaneously, means for applying the output pulse of said last coincidence tube to a utilization circuit, said last output pulse having a repetition rate determined by the switch selection of the counts applied to the first coincidence tube and having a delay with respect to the start of the cycle of operation determined by the switch selection of the counts applied to the second coincidence tube; a drift circuit comprising switching means through which resetting output pulses are applied to the first stage of one of said counters, and means including said switching means for selectively applying said last-mentioned output pulses either to the left side or the right side of said first stage whereby the repetition period of said output pulses may be decreased at will by a period of time equal to the repetition period of the pulses appearing at the output circuit of said one counter.

13. In combination, a system designed for producing repetitive pulses that may be produced at selected repetition rates, said system comprising a chain of counters, each counter having a count-selecting means, a coincidence tube or circuit, means applying said selected counts from the counters of said chain to said coincidence tube whereby it passes an output pulse only in response to the selected counts from each counter occurring simultaneously, means for resetting said counters by said output pulse and at the same time restarting the cycle of operation of the counter chain whereby the repetition rate of said output pulse is determined by the count selection at each of the counters, a stable oscillator for supplying signal to the high frequency end of said chain of counters, a signal translating circuit through which signal from said oscillator is supplied to said chain of counters; a first drift control circuit comprising means associated with said signal translating circuit for blocking the passage of signal from said oscillator to said chain of counters for a predetermined period of time in response to the application of a certain polarity pulse thereto, and means for applying at will to said last means a pulse of said certain polarity which pulse occurs simultaneously with and at the same repetition rate as said resetting output pulse whereby the repetition period of said output pulse is increased as a function of said predetermined period of time; a second drift control circuit comprising switching means through which resetting output pulses are applied to one of said counters, and means including said switching means for selectively applying said last-mentioned output pulses either a point in said one counter which resets said counter chain to zero or to a point in said one counter that resets said counter chain to a count other than zero whereby the repetition period of said output pulses may be decreased at will be a period of time corresponding to said count other than zero.

ROBERT R. FREAS, Jr.

REFERENCES CITED

The following references are of record in the file of this patent:

UNITED STATES PATENTS

| Number | Name | Date |
|---|---|---|
| 2,432,158 | Hulst et al. | Dec. 9, 1947 |
| 2,445,361 | Mountjoy et al. | July 20, 1948 |
| 2,523,244 | Woodward | Sept. 19, 1950 |